(12) United States Patent
Klug et al.

(10) Patent No.: US 6,759,079 B2
(45) Date of Patent: Jul. 6, 2004

(54) SHAPED, CENTER-FILLED CONFECTIONERY PRODUCTS

(75) Inventors: David Klug, Marysville, OH (US); Luther Little, Columbus, OH (US); Brian Makela, Dublin, OH (US)

(73) Assignee: Nestec S.A., Vevey (CH)

( * ) Notice: Subject to any disclaimer, the term of this patent is extended or adjusted under 35 U.S.C. 154(b) by 407 days.

(21) Appl. No.: 09/933,852

(22) Filed: Aug. 21, 2001

(65) Prior Publication Data
US 2002/0102333 A1 Aug. 1, 2002

Related U.S. Application Data (60) Provisional application No. 60/265,111, filed on Jan. 31, 2001.

(51) Int. Cl.[7] ................................. A23G 3/00
(52) U.S. Cl. ................ 426/660; 426/282; 426/514; 426/516
(58) Field of Search ............... 426/660, 282, 426/514, 516

(56) References Cited

U.S. PATENT DOCUMENTS

| | | | | |
|---|---|---|---|---|
| 4,229,484 A | * | 10/1980 | Steels et al. | 426/279 |
| 4,421,773 A | * | 12/1983 | Akutagawa | 426/249 |
| 4,430,351 A | * | 2/1984 | Cillario | 426/103 |
| 4,450,179 A | * | 5/1984 | Vink et al. | 426/103 |
| 4,601,907 A | * | 7/1986 | Knebl et al. | 426/5 |
| 4,911,937 A | * | 3/1990 | Crosello et al. | 426/103 |
| 5,002,791 A | * | 3/1991 | Knebl | 426/660 |
| 5,035,905 A | * | 7/1991 | Knebl | 426/284 |
| 5,578,336 A | * | 11/1996 | Monte | 426/72 |
| 6,024,995 A | * | 2/2000 | Rosso | 426/93 |
| 6,280,762 B1 | * | 8/2001 | Bealin-Kelly et al. | 424/440 |
| 6,528,102 B1 | * | 3/2003 | Coyle et al. | 426/103 |
| 6,531,174 B2 | * | 3/2003 | Barrett et al. | 426/573 |

* cited by examiner

Primary Examiner—N. Bhat
(74) Attorney, Agent, or Firm—Winston & Strawn LLP (57) ABSTRACT

The invention includes an edible confectionery product that has at least two parts. The first part is a base unit formed of a first confectionery and having a top, a bottom, and between five to twelve sides when viewed from above. The second part is a center inclusion formed of a second confectionery. The center inclusion is partially embedded in the base unit and extends above the top of the base unit. The center inclusion is set in, as viewed from the top, from any side of the base unit. The first confectionery has a different composition and preferably has a different texture than the second confectionery. In one preferred embodiment, a plurality of base units are shearably joined.

25 Claims, 3 Drawing Sheets

SHAPED, CENTER-FILLED CONFECTIONERY PRODUCTS

CROSS-REFERENCE TO RELATED APPLICATION

This application claims priority to U.S. Provisional Application No. 60/265,111, filed Jan. 31, 2001, now pending, the disclosure of which is incorporated herein by express reference thereto.

FIELD OF THE INVENTION

The invention relates to a confectionery shape that allows incorporation of multiple large inclusions of center-filled material, while also providing shearability and a positive masticating experience when consumed. More particularly, the present invention relates to a confectionery bar shape that includes a plurality of inclusions and a process for manufacturing the confectionery bar.

BACKGROUND OF THE INVENTION

Confectionery products are available in a variety of flavors, configurations, sizes, textures, and combinations. In recent years, confectionery products having an outer layer of one flavor, color, or type in combination with an inner layer of a second flavor, color, or type of confection have gained popularity. For example, many companies market chewing gum that has been injected with a sweet liquid or a soft center portion that is heavily flavored. As one chews the gum, the flavor-rich interior is released, thereby providing a burst of flavor.

The same concept has been used successfully with various types of candies. Hard candy exteriors are provided with liquid centers, soft candy centers, or hard candy centers of a second flavor. Additionally, those same types of candy centers have been used successfully in combination with an exterior in the form of a flavored gum, a hard candy, or a soft candy, such as caramel. A wide variety of combinations of confectionery products are available that have as their basic configuration a solid exterior portion with a second portion forming a center.

When candy is to be sold commercially, the market generally cannot easily absorb the high labor costs involved in making confectionery products by hand. As a result, candy makers have attempted to develop equipment to minimize the use of hand formation techniques in manufacturing confections. The manufacturing of center-filled confectionery products in a factory, using equipment that continuously manufactures such a product, gives rise to several problems not encountered under the controlled conditions available when making candy by hand.

When manufacturing a center-filled confectionery, two separate confectioneries must be made independently of one another and then passed through a forming process whereby the product is formed into a desired shape. If the candy center to be employed is too viscous to be pumped or is a solid, it may not be injected into the center of a confectionery product. If a solid, it must, therefore, first be molded into a predetermined shape.

One type of confectionery, candy bars, often have had large center inclusions. Examples include BUTTERFINGER®, a hard nutty interior with a chocolate exterior; SNICKERS®, a caramel/nut interior surrounded by a chocolate exterior; REESE'S® PEANUT BUTTER CUPS, a peanut confection surrounded by a chocolate exterior; and KIT KAT®, a layered pastry like confection surrounded by a chocolate exterior. These bars all have the interior portion forming most of the bar, and the chocolate exterior is just a thin outer covering. Such a confectionery provides the consumer with a sense of eating an homogeneous bar.

Other candy bars have small inclusions dispersed therein. Examples include NESTLÉ'S CRUNCH® bar, which has rice puffs dispersed in chocolate. While such dispersions add a different texture to the chocolate, the overall sensation again is of eating an homogenous bar.

What is needed in the art is a confectionery design which provides the consumer a sensation of eating two separate textures. Furthermore, it is desirable that the two textures can be sampled in more than one bite, allowing the consumers to consume one texture or the other semi-independently. What is also needed is an ergonomic-shaped bar that facilitates handling and eating, that provides a sensation of eating two different textures, and that is easy to consume. What is also needed in the art is the apparatus and process for forming such a center-filled confectionery product.

SUMMARY OF THE INVENTION

The invention includes an edible confectionery product which has at least two parts. The first part is a base unit formed of a first confectionery and having a bottom wall, and five to twelve sides when viewed from above. The bottom and sides define a cavity therein. At least some of the sides form an angle of less than 90° with respect to the bottom wall.

The second part is a center inclusion formed of a second confectionery. The inclusion is located in the cavity and is at least partially imbedded therein. The angled walls, preferably when the sides are angled inwardly, assist in retaining the inclusion in the cavity. Advantageously, the first confectionery is different from the second confectionery so that two separate eating textures can be provided by the product.

The distance between the center of the base unit to a side is typically about 1 cm to about 3.5 cm, preferably about 1.5 to 2.5 cm, and more preferably about 1.8 cm to 2.1 cm. The base unit typically has a height of about 0.5 cm to about 2 cm, preferably about 0.8 cm to 1.4 cm, and more preferably about 1 cm to 1.3 cm. The angled base unit sides are typically angled at about 5 degrees to about 15 degrees from perpendicular to the bottom wall, preferably about 7 degrees to 11 degrees. The height of the center inclusion is typically about 0.5 cm to about 2.5 cm, preferably about 1 cm to 2 cm. The center inclusion has a diameter of at least about 1 cm, preferably at least about 1.5 cm, as seen from a top view. The top of the center inclusion is generally about 0.2 cm to about 1.5 cm, preferably 0.3 cm to 0.8 cm, and more preferably about 0.5 cm to 0.7 cm above the top of the base unit. The center inclusion is typically at least about 0.3 cm in from any side of the base unit, preferably at least about 0.4 cm, and more preferably at least about 0.5 cm.

In one embodiment, the base unit has six, eight, or ten sides, and the center inclusion has a rounded top with a radius of curvature of about 1 cm to 4 cm. Preferably, at least half of the sides are angled inwardly to assist in retaining the inclusion in the cavity, and the angles between adjacent sides are substantially equal. At least one of the first or second confectionery may include chocolate, flavored gelatin, a cookie, a layered wafer, ice cream, caramel, or a combination thereof. In a preferred embodiment, the first confectionery includes chocolate and the second confectionery includes a baked product.

In another embodiment, the first confectionery may include chocolate and one or more of rice puffs, cookie bits, toffee, ground nuts, fruit, or a grain-based ceral product sized at about 800 counts to 6000 counts per pound. In another embodiment, the first confectionery includes chocolate and the second confectionery includes a peanut-based, caramel-based, crunch, chewy, nutty, coconut-based, or chocolate-based confectionery, a gelatin gummie, a sugar panned sphere, a fudge, a fondant, a taffy, a nougat, or a combination thereof. Preferably, the second confectionery includes at least 50% by volume of a plurality of rice puffs, nuts, or a combination thereof.

In one embodiment, the center inclusion includes a homogeneous body with a diameter of about 1 cm to 2 cm and weighs about 20 counts to 400 counts per pound. In another embodiment, the center inclusion includes a puffed rice ball or disk with a diameter of about 1.3 cm to 2 cm. In another embodiment, the product includes two to six base units each having a center inclusion, the individual base units being connected on at least one side to another base unit, wherein the connection is shearable between base units to separate the base units for consumption. Preferably, the side that is connected to another base unit is longer than the sides immediately adjacent thereto. In one preferred embodiment, the product includes three or four base unites, and at least one center inclusion is formed of different confectionery than the other center inclusions.

The invention also includes a process of making edible confectionery products having at least two different textures. A mold with a bottom wall and a plurality of convex downward-facing cavities sized and adapted to accept center inclusions and with a five to twelve sided geometric cavity disposed above each downward-facing convex cavity is provided. At least some of the sides of the cavity form an angle of less than 90° with respect to the bottom wall. At least a portion of a first moldable confectionery is provided in the convex cavities. A center inclusion formed of a second confectionery which is different from the first confectionery is placed into each of the convex cavities. The remainder of the first confectionery is added into the convex cavities around the center inclusion, thereby completing the walls of the base unit of the product. Finally, the product is cooled and removed from the mold. The product has angled sides made of the first confectionery which assist in retaining the center inclusion in the confectionery products.

BRIEF DESCRIPTION OF DRAWINGS

The invention will be better understood in relation to the attached drawings illustrating preferred embodiments, wherein.

DETAILED DESCRIPTION OF THE INVENTION

The invention satisfies the long-standing consumer need for a dual-textured confectionery that is non-homogenous. The invention includes a confectionery bar made of at least one base unit, wherein each base unit includes a body and at least one center inclusion that is different from the body of the bar.

Referring to the drawings, in one embodiment, the base unit 10 of the product when viewed from above is a geometric shape. The base unit shape may be a five to twelve sided figure, where each side when viewed from above is substantially straight. Preferably, the top of the product has a rounded, shape and the bottom of the product is flat, and each of the five to twelve sides are straight. The preferred top shape is at least substantially oval. The preferred bottom shape is a six, eight, or ten-sided figure, for example, a hexagon, octagon, or decagon, where opposing sides are substantially parallel to one another, so that a plurality of base units can be connected on opposing sides to form a straight bar 20 made of a plurality of units, such as at least three base units. The most preferred shape is an eight-sided figure, for example, an octagon.

Figure 1:
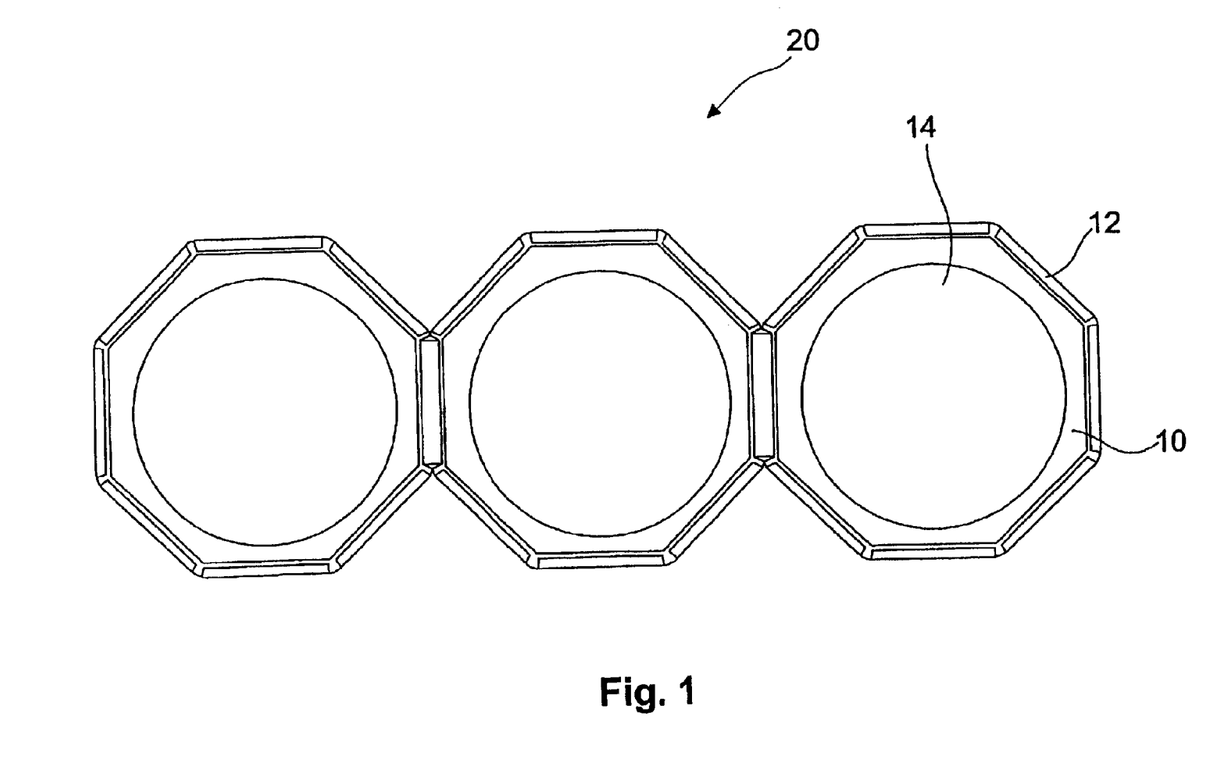
FIG. 1 shows a top view of a preferred embodiment of the multiple-base confectionery.
Figure 2:
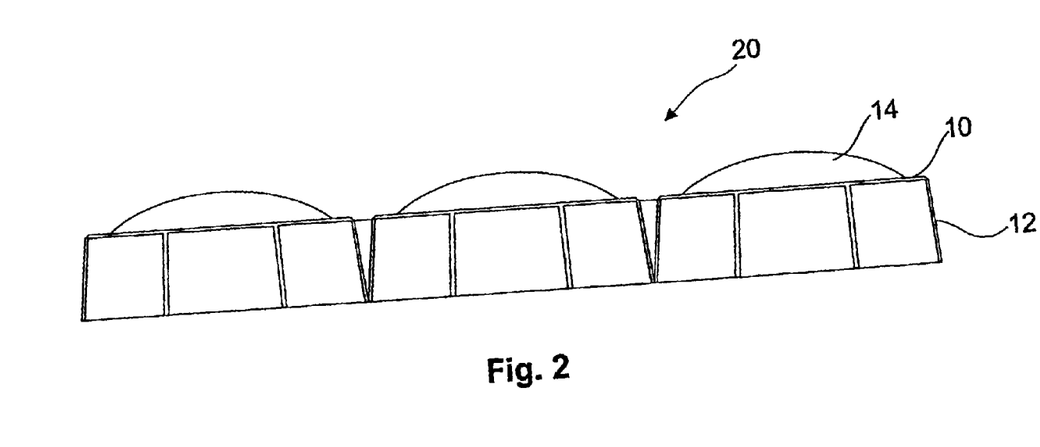
FIG. 2 shows a side view of a preferred embodiment of the multiple-base confectionery.
Figure 3:
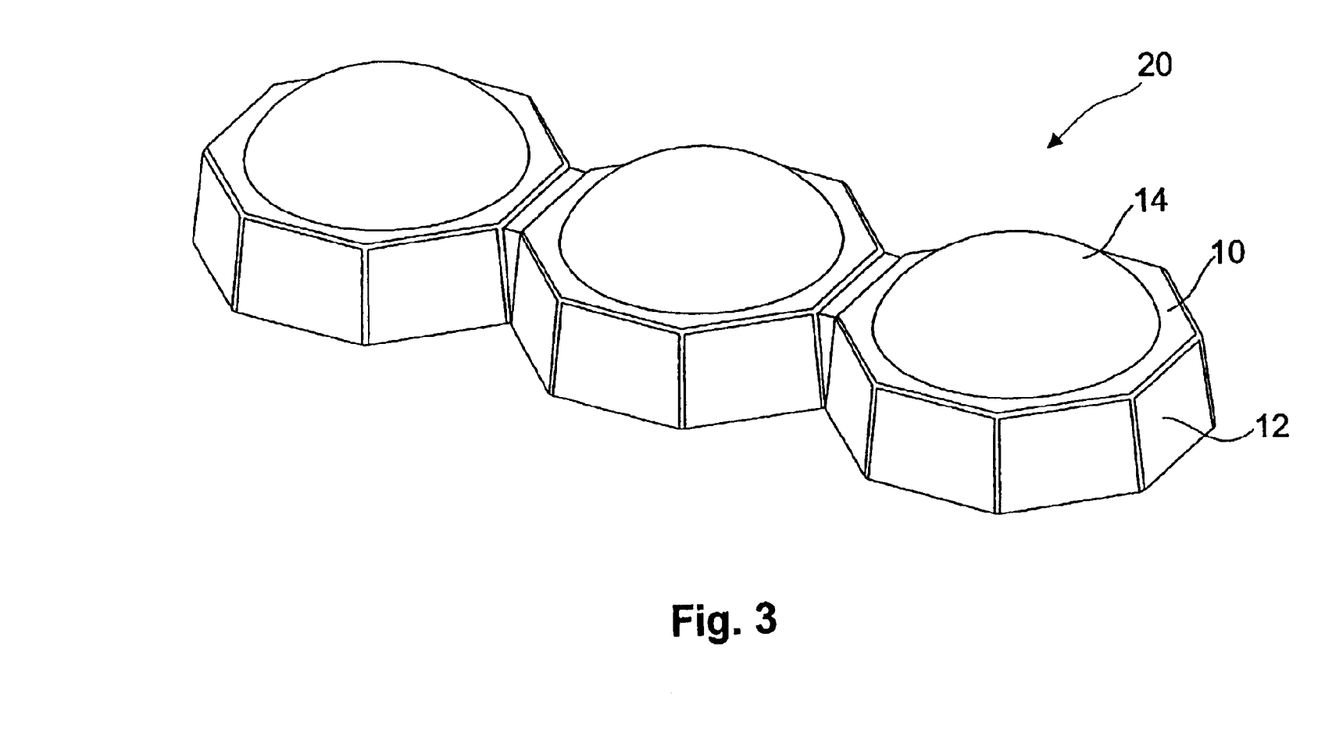
FIG. 3 shows a perspective view of a preferred embodiment of the multiple-base confectionery.
Figure 4:
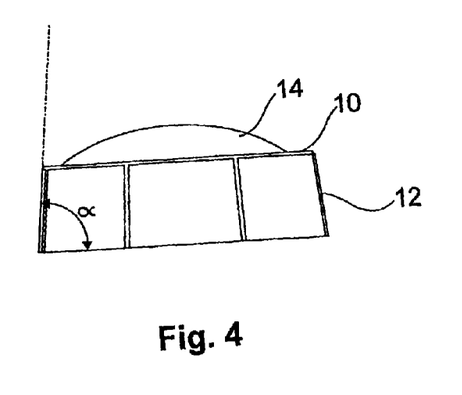
FIG. 4 shows a side view of a preferred embodiment of a single base confectionery.

Each side 12 of the base unit may be, but is not necessarily, of the same length as other sides, i.e., a pentagon, hexagon, heptagon, octagon, and the like. At least two, and preferably at least half, of the number of sides are angled inwardly as shown in FIG. 4 to assist in retaining the inclusion in the cavity and to facilitate removing the product from the mold. For simplicity, all sides can be angled inwardly.

The angles between adjacent sides may, but do not necessarily have to be, the same. In a preferred embodiment, the angles between all adjacent sides are the same. For example, in the preferred eight sided figure, the angle between each adjacent side is about 135 degrees. In a six sided figure, the angle between adjacent sides is about 120 degrees.

A straight bar formed from a plurality, for example 2 to 6 base units, more preferably 3 to 4 base units, is preferably readily shearable at the union between base units. Preferably, the shearing can be readily accomplished by a reasonable force applied by the consumer enjoying the product. In one preferred embodiment, three base units are connected to form a straight bar, and the sides that are connected to other base units are longer than the sides immediately adjacent thereto.

The base units are designed to be bite-sized or to be consumed in several bites, depending both on the consumer and on the size selected. Preferably, the unit should be sized and shaped to be consumed in several bites. The base unit may be about 1 cm to about 3.5 cm in radius, where the radius is defined as the distance between the center of the bar as viewed from above to the closest point of any one side of the base unit. Preferably, the base unit radius may be about 1.5 cm to about 2.5 cm, more preferably about 1.8 cm to about 2.1 cm.

In a preferred embodiment, the distance between the center of the base unit to a side, as viewed from above, is from about 1.8 to about 2.1 cm; the height of the base unit is about 1 to about 1.3 cm; the height of the center inclusion is preferably as seen from a side view is about 1.3 cm to about 1.7 cm; the top of the center inclusion about 0.5 cm and about 0.7 cm above the top of the base unit; the diameter of the center inclusion as seen from a top view is at least about 1.5 cm; and the center inclusion is at least 0.5 cm, as viewed from the top, inward from the outermost portion of any side of the base unit.

In one embodiment, the distance between the center of the base unit, as viewed from above, to a side is about 1 cm to about 3.5 cm and the height of the base unit is about 0.5 cm to about 2 cm. The base unit sides are angled about 5 degrees to about 15 degrees from perpendicular to facilitate removing the product from a mold and to provide visual appeal to the final product.

The height of the base unit, excluding the center inclusion, is about 0.5 cm to about 2 cm, more preferably about 0.8 cm to about 1.4 cm, most preferably about 1 cm to about 1.3 cm. This height allows the center inclusion to rise above the base unit while still allowing both the base unit and the center inclusion to be easily bitten.

At least some of the sides should be angled with respect to the bottom, preferably at an angle of less than 90° from the bottom, and depicted in FIG. 4 as α. As shown in FIG. 4, all the sides of the base unit are advantageously angled, for example from about 5 degrees to 15 degrees, preferably at from about 7 degrees to 11 degrees, from a plane that is perpendicular to the bottom. The angle is preferably such that the radius of a base unit at the bottom edge is greater than the radius of a base unit measured at the top edge. This inwardly directed angle allows the confectionery bar to be easily released from the product forming molds and provides visual appeal to the final product. It also enables the sides to assist in retaining the center inclusion in the cavity. The solidification of the walls around the inclusion can also assist in retaining the inclusion in the cavity.

A plurality of base units can be connected to form a larger bar. The bar so formed is advantageously shearable at the union between adjacent base units. Preferably, three to five base units are fixed together in a single line, more preferably, three to four base units are fixed together in a single line. Of course, two adjacent base units may share a side, or more preferably, additional confectionery may be added to the attaching sides of the adjacent base units to affect the connection between adjacent base units.

The confectionery that forms the base unit is prepared according to any of those recipes known in the art of candy/confectionery making. The base unit can be made of any moldable confectionery or combination of confectioneries, including chocolate, a solid or layered wafer, ice cream, caramel, and the like. It is preferred that the base mold be formed of at least one chocolate.

The base mold can include small inclusions, including air or another gas to form small bubbles, small rice puffs or cookie bits (about 800 to 6000 count per pound), toffee, ground nuts, or fruit, for example raisins, dates, figs, orange peel, lemon peel, lime peel, or the like, or combinations thereof. These inclusions when used are preferably sized and shaped to allow a visually smooth bar to be formed by molding. The base mold may also include a grain-based cereal product, such as NESTUM®.

Each base unit advantageously contains a center inclusion 14. The center inclusion can be of a random shape or any geometric shape when viewed from above, such as a polygon or a circle or oval. The center inclusion is preferably a sphere, a disk, or a sphere partially flattened along one axis to reduce the height of the inclusion, i.e., an oval.

The height of the center inclusion as seen from a side view is about 0.5 cm to about 2.5 cm, preferably about 1 cm to about 2 cm, more preferably about 1.3 cm to about 1.7 cm. As the center inclusion beneficially resides on and in the base unit, the height of the finished confectionery is typically about 0.8 cm to about 2.8 cm, preferably about 1.3 cm to about 2.3 cm, and more preferably about 1.6 cm to about 2 cm. The center inclusion is partially embedded in the base unit, so that the top of the center inclusion (and any thin layer of confectionery covering the center inclusion) preferably reaches a height of about 0.2 cm to about 1.5 cm, preferably about 0.3 cm to about 0.8 cm, and more preferably about 0.5 cm to about 0.7 cm, above the top of the base unit. Again, the sizes are selected so that the confectionery bar can be readily consumed.

In one embodiment, the center inclusion formed of a second confectionery that preferably has a different texture than the confectionery used to form the base unit. The height of the center inclusion is about 0.5 cm to about 2.5 cm, and the diameter of the center inclusion as seen from a top view is at least about 1 cm. The center inclusion is partially embedded in the base unit, so the top of the center inclusion is about 0.2 cm to about 1.5 cm above the top of the base unit. Furthermore, the center inclusion is typically at least 0.3 cm, as viewed from the top, in from any side of the base unit.

The diameter of the center inclusion as seen from a top view should be at least about 0.5 cm, preferably at least about 1.5 cm. The upper limit on the diameter of the center inclusion is determined from the size of the base. The diameter of the center inclusion should be at least 0.3 cm, preferably at least about 0.4 cm, and more preferably at least about 0.5 cm, less than the diameter of the base unit measured at the bottom of the base unit. The center inclusion, plus any confectionery coating thereon, should be at least about 0.3 cm from the top edge of the base unit, to convey a sense of eating a candy with a center inclusion and not simply a coated center inclusion. The center inclusion typically has a diameter of about 1 cm to about 2.5 cm, preferably about 1.5 cm to about 2 cm.

The center inclusion is beneficially shaped, optionally with additional confectionery such as that used in the base unit, to provide a rounded top, as if a slice from a sphere was placed on the top of the base unit. The difference in shape between the center inclusion and the base unit heightens the consumer awareness of consuming two different confectioneries. The radius of curvature of this top, which may be a thin layer of confectionery over the center inclusion, is preferably about 1 to about 4 cm, more preferably about 1.5 and 2.5 cm.

The size of the center inclusion and of the base unit are important. Too small an inclusion would be viewed as perhaps a crisp or cookie bit or nut in chocolate, which is known in the art. Too small a base unit would have the appearance of simply a covered or dipped confectionery.

The center inclusion can be a material with a different texture, or a different appearance, or a different taste, or any combination thereof, than the base unit confectionery. Preferably, the center inclusion is a material with at least two of the following: a different texture, a different appearance, and a different taste than the base unit confectionery, and more preferably all three are different. The center inclusion can be peanut-based, caramel-based, "BUTTERFINGER®"-based, coconut-based, or any other suitable edible confectionery. In one embodiment, the center inclusion is a plurality of rice puffs or nuts held together by another confectionery, such as chocolate, similar to the NESTLÉ'S CRUNCH® bar.

In a preferred embodiment, the center inclusion is a singular homogeneous body, for example one large puffed rice ball with a diameter of about 1 cm to about 2 cm. Manufacture of such a rice puff can be accomplished by any method known to one of ordinary skill in the art, for example, that described in U.S. Pat. No. 5,871,793. Rice cakes can be made by a process comprising the steps of: (i) providing a mold including a reciprocally movable piston element for compressing rice grains inside the mold; (ii) introducing a predetermined quantity of rice flour, water, sugar, and malt or other flavoring agent into the mold; (iii) compressing the rice grains in the mold to about 6 MPa (60 bar) pressure; (iv) heating the rice grains in the mold; (v)

moving the piston element to expand the mold by a predetermined amount, whereupon the heated rice grains expand and bond together to form the rice puff, followed by (vi) removing the finished rice cake from the mold. The rice puffs can be flavored or colored with, for example, nuts or cocoa.

Rice is the most commonly, but not the only advantageously used flour. Consequently, when the expression "rice" appears herein, the term is understood to be used in the illustrative rather than the limiting sense to mean any type of flour-based inclusion.

The center inclusion can also be a cookie, or fudge, or a brownie, or other baked or confectionery composition with the desired taste and texture. The center inclusion can further include gelatin gummies, sugar panned spheres, for example, GOBSTOPPERS®, fondant, taffy, fudge, nougat, or any combination of the above-noted suitable center inclusions.

The center inclusion is an ideal ingredient for a candy bar producer to mold into the bar to provide a sensory perception in the consumer of a multi-textured confectionery. The size of the center inclusion will generally be in the range of about 20 count to about 400 count per pound, and preferably about 40 count to about 200 count per pound, depending on the composition of the center inclusion.

In one embodiment, the second confectionery includes at least about 50% by volume of a plurality of rice puffs, nuts, or combination thereof, held together by a moldable confectionery.

In a preferred embodiment, the center inclusion includes a homogeneous body with a diameter of about 1 cm to about 2 cm, for example a puffed rice ball with a diameter of about 1.3 cm to about 2 cm, that weighs about 20 count to about 400 count per pound, more preferably about 40 count to about 200 count per pound.

In the production of these confectionery products, a liquefied confectionery medium, such as chocolate, can be first poured into molds where it is then solidified by a cooling process, and thus molded. A lower mold in the shape of the product is formed with at least one, and preferably a plurality, of molds sized and adapted to accept center inclusions. Preferably, the molds are convex and the center inclusion rests therein. A mating upper mold adapted for nesting attachment to the lower mold can also be beneficially provided.

The confectionery can be formed by a continuous molding process. The use of the term "continuous" is designed to reflect modern manufacturing techniques in which a confectionery product of this nature is continuously manufactured. Rather than manufacture candies in a piecemeal operation such that one "batch" of candy is produced at a time, the process of the present invention is designed for use in modern manufacturing facilities in which the processes that transform initial ingredients into a final product may be continuously in operation. It will be appreciated, however, that the processes of the present invention will also work effectively in systems in which only one "batch" of a product is prepared at a time.

The present invention provides a simple and convenient way to incorporate any one of a wide variety of inclusions into the center of a confectionery while still remaining visible to the consumer. Examples of the different varieties and types of inclusions that can be included in the confectionery products of the invention are described herein.

The center inclusion is typically first formed by mixing together the ingredients and cooking the mixture, as needed, such that the center inclusion is ready to be inserted into the end product. If the center inclusion is a baked pastry-type product, water absorbed into the center inclusion after it has been finally coated can result in expansion forces that put stresses on the final coating, which may ultimately result in cracking of the final coating. There are two principal sources of moisture for water absorption into the wafers contained in typical enrobed confectioneries. First, there is the moisture contained in the ambient air, which may pass through the wrapper and through the final coating. Second, there is the moisture contained in the confectionery itself. Therefore, in one preferred embodiment, baked pastry inclusions that are substantially free, or totally free, of water can be used to minimize or avoid moisture and any cracking in the coating.

The invention also includes the process of making the edible confectionery product. The process of making edible confectionery products having at least two different textures includes: providing a mold with a bottom wall and a plurality of convex downward-facing cavities sized and adapted to accept center inclusions and with a five to twelve sided geometric cavity disposed above each downward-facing cavity, with at least some of the sides of the cavity forming an angle of less than 90° with respect to the bottom wall (shown in FIG. 4 as α); providing at least a portion of first moldable confectionery in the cavities; placing a center inclusion formed of a second confectionery that is different than the first confectionery into each of the cavities; adding the remainder of the first confectionery into the cavities around the center inclusion; and cooling the product and removing the product from the mold. The product has angled sides made of the first confectionery, which sides assist in retaining the center inclusion in the confectionery products.

The first step is to provide a mold with a plurality of convex downward-facing cavities sized and adapted to accept center inclusions and with a five- to twelve-sided geometric figure disposed above each downward-facing cavity, wherein the distance between the center of the bar as viewed from above to a side of the geometric figure is about 1 cm to about 3.5 cm; the height of the geometric figure is about 0.5 cm to about 2cm; the sides of the geometric figure are at least about 0.3 cm from the side of the convex cavity; a plurality of the sides of the geometric figure are angled about 5 degrees to about 15 degrees from perpendicular; and the bottom of the convex cavity is about 0.2 cm to about 1.5 cm below the geometric figure. A center inclusion formed of a second confectionery, wherein the height of the center inclusion is about 0.5 cm to about 2.5 cm and the diameter of the center inclusion as seen from a top view is at least about 1 cm, is then placed into the convex cavity. A first moldable confectionery including at least one confectionery material is then added to the mold. The product is then cooled and removed from the mold.

Other combinations may be advantageous to provide a product where the center inclusion is not visible. For example, a portion of the first confectionery may be added to the mold and cooled prior to adding the center inclusion and the remaining first confectionery. Or, a portion of the first confectionery and the center inclusion may be added to the mold and cooled prior to adding the remaining first confectionery.

A mold is provided that has the shape of the final product. The mold is typically in the inverse image of the finished product, and is beneficially upside down so that when filled with confectionery the top of the confectionery is the bottom of the product. If the center inclusion has a density less than that of the base unit confectionery, the center inclusion can be placed into the mold, and molten base unit confectionery can be added, wherein a top holds the center inclusion into the molten base unit confectionery. The product is then cooled and removed from the bar, and the top of the bar will be smooth and will not have the center inclusion be visible.

If the center inclusion is more dense than the molten base unit confectionery, it may be necessary to first add at least some base unit confectionery to the mold, beneficially setting or solidifying the molten confectionery at the bottom of the mold, and then additional molten base unit confectionery can be added as needed. The first solidified molten confectionery prevents the center inclusion from sinking to the bottom of the mold, where it would be visible on the top of the bar.

When making a center-filled candy, it may sometimes be desirable to employ an exterior coating or shell that includes more than one type, color, or flavor of confectionery. The present invention also allows two or more different candies to be employed as an exterior layer. In such a case where two different candies are used, the first molten "base unit" confectionery may be added, the center inclusion added, and then a second molten "base unit" confectionery can be added. Such combinations will be readily apparent to one of ordinary skill in the art with the benefit of this disclosure.

The fat and water content of the confectioneries may be adjusted as is known in the art to prevent delamination of the base unit confectionery from the center inclusion.

It may also be desirable to employ center inclusions of differing types in various base units within a single product that includes a plurality of base units. For example, a finished product may include three base units joined on opposing sides to form a line, and the center inclusions added to each base unit may be the same or different, for example a regular rice puff, a chocolate rice puff, or a brownie, and a peanut-flavored rice puff or other peanut confectionery. Such combinations will enhance consumer interest in the product.

A preferred product includes a plurality, for example 2 to 6 base units, preferably 3 or 4 base units, each with a center inclusion, where the individual base units are connected on at least one side to one another. The connection is shearable between base units, and the side that are connected to other base units be longer than the sides immediately adjacent thereto to provide the required strength. At least one center inclusion formed of different confectionery than another center inclusion.

The term "about," as used herein, should generally be understood to refer to both numbers in a range of numerals. Moreover, all numerical ranges herein should be understood to include each whole integer within the range.

While the confectionery invention is intended primarily for use as candy, for example chocolate, it is envisioned that the same shape bar with large center inclusions can also be formed with ice cream, cake-type confectioneries, cookie-type confectioneries, flavored gelatin, and the like.

The product is an edible article of manufacture for ingestion, having a predetermined structural characteristic defined by the size and shape of both the base unit and the center inclusion. It will be appreciated that numerous modifications and embodiments may be devised by those skilled in the art. Therefore, it is intended that the appended claims cover all such modifications and embodiments as falling within the true spirit and scope of the present invention.

What is claimed is:

1. An edible confectionery product comprising:
    a base unit formed of a first confectionery having a bottom wall and between five to twelve sides and defining a cavity therein, with at least some of the sides forming an angle of less than 90° with respect to the bottom wall; and
    a center inclusion formed of a second confectionery, the inclusion located in the cavity and being at least partially imbedded therein, wherein the first confectionery is different from the second confectionery.

2. The edible confectionery product of claim 1, wherein the base unit has six, eight, or ten sides, and the center inclusion has a rounded top with a radius of curvature of about 1 cm to about 4 cm.

3. The edible confectionery product of claim 1, wherein the base unit has six, eight, or ten sides, and at least half of the sides are angled inwardly to assist in retaining the inclusion in the cavity, wherein the angles between adjacent sides are substantially equal, and the center inclusion has a rounded top with a radius of curvature of about 1 cm to about 4 cm.

4. The edible confectionery product of claim 1, wherein at least one of the first or second confectionery comprises chocolate, flavored gelatin, a cookie, a layered wafer, ice cream, caramel, or a combination thereof.

5. The edible confectionery product of claim 1, wherein the first confectionery comprises chocolate, and wherein the second confectionery comprises a baked product.

6. The edible confectionery product of claim 1, wherein the first confectionery comprises chocolate and one or more of rice puffs, cookie bits, toffee, ground nuts, fruit, or a grain-based cereal product, wherein the rice puffs, cookie bits, toffee, ground nuts, or fruit are sized at about 800 counts to about 6000 counts per pound.

7. The edible confectionery product of claim 1, wherein the first confectionery comprises chocolate and the second confectionery comprises a peanut-based confectionery, a caramel-based confectionery, a nutty confectionery, a coconut-based confectionery, a chocolate-based confectionery, a gelatin gummie, a sugar panned sphere, a fudge, a fondant, a taffy, a nougat, or a combination thereof.

8. The edible confectionery product of claim 1, wherein the second confectionery comprises at least 50% by volume of a plurality of rice puffs, nuts, or a combination thereof.

9. The edible confectionery product of claim 1, wherein the center inclusion comprises a homogeneous body with a diameter of about 1 cm to about 2 cm and weighs about 20 counts to about 400 counts per pound.

10. The edible confectionery product of claim 1, wherein the center inclusion comprises a puffed rice ball or disk with a diameter of about 1.3 cm to about 2 cm.

11. The edible confectionery product of claim 1, comprising 2 to 6 base units each having a center inclusion, the individual base units being connected on at least one side to another base unit, wherein the connection is shearable between base units to separate the base units for consumption.

12. The edible confectionery product of claim 11, wherein the side that is connected to the side of another base unit is longer than the sides immediately adjacent thereto.

13. The edible confectionery product of claim 11, wherein the number of base units is 3 or 4, and at least one center inclusion is formed of different confectionery than the other center inclusions.

14. The new edible confectionery product of claim 1, wherein the center inclusion comprises a single homogeneous body.

15. The edible confectionery product of claim 1, wherein the center inclusion is visible.

16. The edible confectionery product of claim 1, wherein the center inclusion is coated with a confectionery so that it is not visible.

17. An edible confectionery product comprising:
a base unit having a top and a center, and being formed of a first confectionery having a bottom wall and between five and twelve sides and defining a cavity therein, with at least some of the sides forming an angle of less than 90° with respect to the bottom wall; and
a center inclusion having a top and being formed of a second confectionery, the inclusion located in the cavity and being at least partially embedded therein, wherein the first confectionery is different from the second confectionery, wherein a distance between the center of the base unit to a side is about 1 cm to about 3.5 cm, the base unit has a height of about 0.5 cm to about 2 cm, and the angled base unit sides are angled at about 5 degrees to about 15 degrees from perpendicular to the bottom wall;
wherein the height of the center inclusion is about 0.5 cm to about 2.5 cm with the center inclusion having a diameter of at least about 1 cm as seen from a top view; and
wherein the top of the center inclusion is about 0.2 cm to about 1.5 cm above the top of the base unit, and the center inclusion is at least about 0.3 cm in from any side of the base unit.

18. The edible confectionery product of claim 17, wherein the distance between the center of the base unit to a side, as viewed from above, is about 1.5 cm to about 2.5 cm; the height of the base unit is about 0.8 cm to about 1.4 cm; a plurality of the base unit sides are angled about 7 degrees to about 11 degrees from perpendicular; the height of the center inclusion is about 1 cm to about 2 cm; the top of the center inclusion is about 0.3 cm to about 0.8 cm above the top of the base unit; and the center inclusion is at least 0.4 cm in from the outermost portion of any side of the base unit.

19. The edible confectionery product of claim 17, wherein the distance between the center of the base unit to each side, as viewed from above, is about 1.8 cm to about 2.1 cm; the height of the base unit is about 1 cm to about 1.3 cm; the height of the center inclusion is about 1.3 cm to about 1.7 cm; the top of the center inclusion is about 0.5 cm to about 0.7 cm above the top of the base unit; the diameter of the center inclusion as seen from a top view is at least about 1.5 cm; and the center inclusion is at least 0.5 cm in from the outermost portion of any side of the base unit.

20. A process of making edible confectionery products having at least two different textures, which comprises:
providing a mold with a bottom wall and a plurality of convex downward-facing cavities sized and adapted to accept center inclusions and with a five to twelve sided geometric cavity disposed above each downward-facing convex cavity, with at least some of the sides of the cavity forming an angle of less than 90° with respect to the bottom wall;
providing at least a portion of first moldable confectionery in the convex cavities;
placing a center inclusion formed of a second confectionery which is different than the first confectionery into each of the convex cavities,
adding the remainder of the first confectionery into the convex cavities around the center inclusion; and
cooling the product and removing the product from the mold, wherein the product has angled sides made of the first confectionery which assist in retaining the center inclusion in the confectionery products.

21. The process of claim 20, wherein a portion of the first confectionery is added to the mold and is cooled prior to adding the center inclusion and the remaining first confectionery.

22. The process of claim 20, wherein a portion of the first confectionery and the center inclusion are added to the mold and cooled prior to adding the remaining first confectionery.

23. The process of claim 20, wherein the center inclusions are placed into respective cavities in a manner such that the center inclusions are visible.

24. The process of claim 20, wherein the center inclusions are placed into respective cavities and then are coated with a confectionery so that the center inclusions are not visible.

25. A process of making edible confectionery products having at least two different textures, which comprises:
providing a mold with a bottom wall and a plurality of convex downward-facing cavities sized and adapted to accept center inclusions and with a five to twelve sided geometric cavity having a center and a height, and being disposed above each downward-facing convex cavity, with at least some of the sides of the cavity forming an angle of less than 90° with respect to the bottom wall;
providing at least a portion of first moldable confectionery in the convex cavities;
placing a center inclusion having a height and a diameter, and being formed of a second confectionery which is different than the first confectionery, into each of the convex cavities,
adding the remainder of the first confectionery into the convex cavities around the center inclusion; and
cooling the product and removing the product from the mold, wherein the product has angled sides made of the first confectionery which assist in retaining the center inclusion in the confectionery products, wherein a distance between the center of the geometric cavity to a side of the geometric cavity is about 1 cm to about 3.5 cm; the height of the geometric cavity is about 0.5 cm to about 2 cm; the sides of the geometric cavity are at least 0.3cm out from the side of the convex cavity; a plurality of the sides of the geometric cavity are angled about 5 degrees to about 15 degrees from perpendicular; and the bottom of each convex cavity is about 0.2 cm to about 1.5 cm below the geometric cavity; and wherein the height of the center inclusion is about 0.5 cm to about 2.5 cm and the diameter of the center inclusion is at least about 1 cm.

* * * * *

UNITED STATES PATENT AND TRADEMARK OFFICE
CERTIFICATE OF CORRECTION

PATENT NO. : 6,759,079 B2
DATED : July 6, 2004
INVENTOR(S) : Klug et al.

It is certified that error appears in the above-identified patent and that said Letters Patent is hereby corrected as shown below:

Column 10,
Line 60, change "The new edible confectioncry product of claim 1," to -- The edible confectionery product of claim 1, --.

Signed and Sealed this

Twenty-first Day of December, 2004

JON W. DUDAS
*Director of the United States Patent and Trademark Office*